(No Model.)
C. L. BAKER.
TWO WHEELED VEHICLE.
No. 426,753. Patented Apr. 29, 1890.
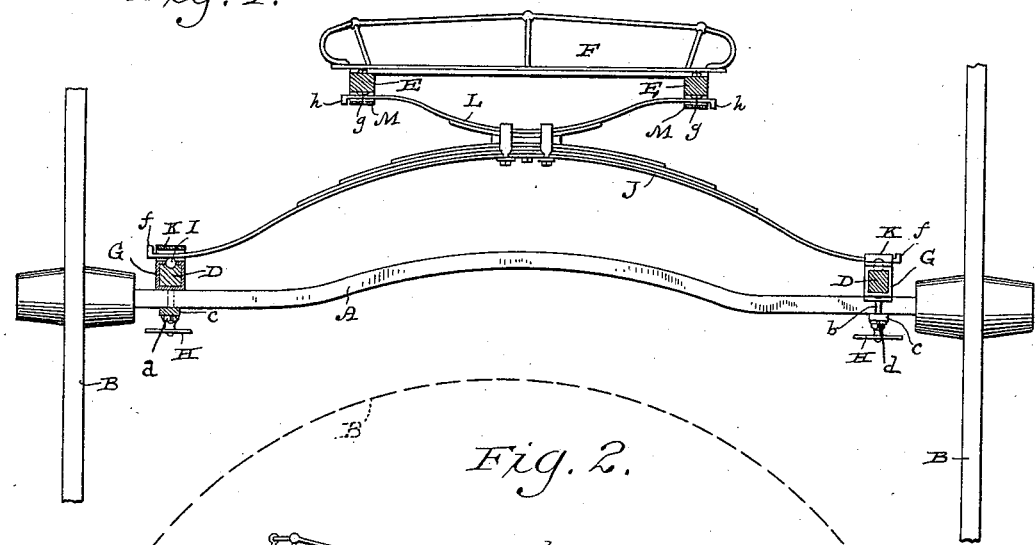
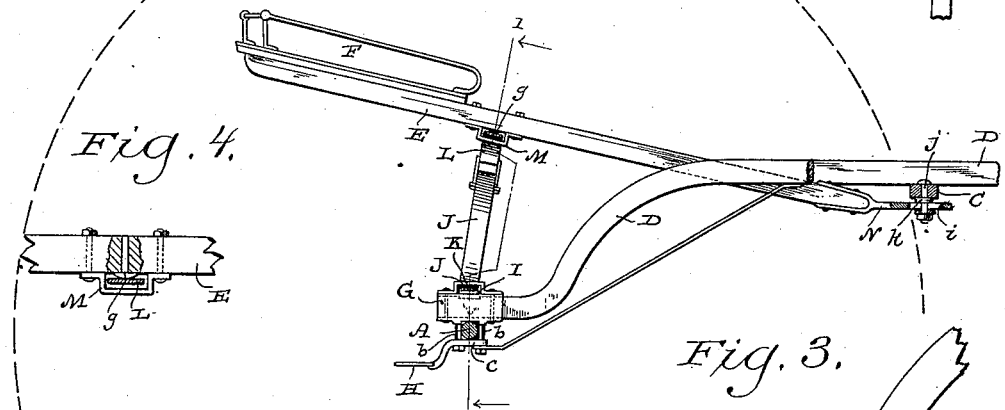
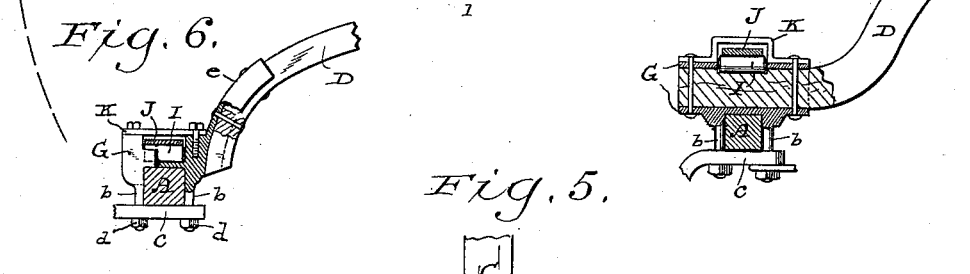
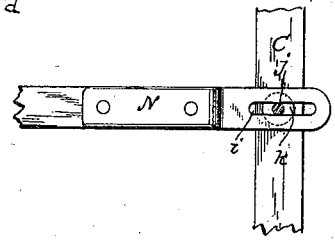
Witnesses
Geo. W. Young.
N. E. Oliphant
Inventor
Clayton L. Baker
By Stout & Underwood
Attorneys
THE NORRIS PETERS CO., PHOTO-LITHO., WASHINGTON, D. C.

UNITED STATES PATENT OFFICE.

CLAYTON L. BAKER, OF MOLINE, ILLINOIS.

TWO-WHEELED VEHICLE.

SPECIFICATION forming part of Letters Patent No. 426,753, dated April 29, 1890.

Application filed November 13, 1889. Serial No. 330,114. (No model.)

*To all whom it may concern:*

Be it known that I, CLAYTON L. BAKER, of Moline, in the county of Rock Island, and in the State of Illinois, have invented certain new and useful Improvements in Two-Wheeled Vehicles; and I do hereby declare that the following is a full, clear, and exact description thereof.

My invention relates to two-wheeled vehicles; and it consists in certain peculiarities of construction and combination of parts, to be hereinafter described with reference to the accompanying drawings and subsequently claimed.

In the drawings, Figure 1 represents a vertical transverse section of a two-wheeled vehicle constructed according to my invention, the section being taken on line 1 1 of Fig. 2. Fig. 2 represents a side elevation of a portion of the vehicle, partly in section; Fig. 3, a detail sectional view illustrating a coupling for a double-bent thill; Fig. 4, a detail elevation, partly in section, showing a bearing for an end of a semi-elliptic spring; Fig. 5, a detail under side view of the connection between the seat-bars and cross-bar of the vehicle, and Fig. 6 a detail sectional view illustrating a coupling for a single-bent thill.

Referring by letter to the drawings, A represents the axle, B the wheels, C the cross-bar, D the thills, E the seat-bars, and F the seat, of a vehicle embodying my improvements.

Supported on the axle A are boxes G, having depending lugs $b$ arranged on each side of said axle and passed through plates $c$ to engage with nuts $d$, the plates being preferably the shanks of steps H, that are usual in that class of vehicles to which my invention relates.

As best illustrated in Fig. 3, a box G employed in connection with a double-bent thill is in the form of a sleeve that receives the rear end of said thill, the latter being bolted or otherwise suitably secured in this position. Arranged in an opening in the sleeve to rest upon the thill is a ball or roll I, that supports an end of a semi-elliptic spring J, the latter being clipped to the axle.

As illustrated in Fig. 6, a box G employed in connection with a single-bent thill is in the form of a casting recessed to receive the ball or roll I and provided with an arm $e$, that is bolted or otherwise suitably secured to said thill. In both forms of boxes a plate K is bolted thereto to prevent the ends of the spring from flying up, said ends of the spring being preferably provided with flanges $f$, that serve as stops to limit the inward draw of said spring.

Clipped or otherwise suitably secured to the spring J is another semi-elliptic spring L, that supports the seat-bars E, the ends of the latter spring being passed under rub-irons or bolt-heads $g$ between said seat-bars and plates M, bolted or otherwise suitably secured thereto, as best illustrated in Fig. 4, the bolt-heads being substantially what are termed "cone-bearings." Like the spring J, the one L is provided at its ends with flanges $h$, that serve as stops to limit the inward draw of the latter spring.

Instead of the balls or rolls I, cone-bearings may be employed for the ends of the spring J, and it is equally obvious that said balls or rolls may be substituted for the cone-bearings employed for the ends of spring L, it being a question of practice which form of bearing may be found best suited for the purpose.

Secured to the forward end of each seat-bar E is a plate N, provided with a longitudinal slot $i$, that engages a bolt $j$, depending from the cross-bar C, a washer $k$ being preferably interposed between the plate and cross-bar to prevent wear upon the latter.

By the construction above described it will be seen that the springs J L have a lateral play on their bearings, thereby lessening the strain and increasing the ease of motion and elasticity, while at the same time I rest the seat-bars directly upon the upper spring, and thus do away with the spring-bar or seat-bolster ordinarily employed in this style of two-wheeled vehicle. It will also be observed that the slotted irons at the front ends of the seat-bars will permit a longitudinal play of the latter, and thus overcome the horse motion incident to vehicles of the class to which my improvements relate.

Having thus described my invention, what I claim as new, and desire to secure by Letters Patent, is—

1. In a two-wheeled vehicle, the combination of the axle, boxes arranged thereon, a semi-elliptic spring having its ends loosely arranged in the boxes, the seat-bars also provided with boxes, and a semi-elliptic spring secured to the one first named and having its ends loosely arranged in the boxes on said seat-bars, substantially as set forth.

2. In a two-wheeled vehicle, the combination of the axle, boxes arranged thereon and provided with thill-connections, a semi-elliptic spring having its ends loosely arranged in the boxes, the seat-bars provided with boxes, and a semi-elliptic spring secured to the one first named and having its ends loosely arranged in the boxes on said seat-bars, substantially as set forth.

3. In a two-wheeled vehicle, the combination of the axle, boxes thereon, a semi-elliptic spring having the ends thereof loosely arranged in the boxes, the seat-bars having forward extensions provided with longitudinal slots, bolts passed through the cross-bar of the vehicle to engage said slots, boxes on said seat-bars, and a semi-elliptic spring secured to the one first named and having its ends loosely arranged in the boxes on the seat-bars, substantially as set forth.

In testimony that I claim the foregoing I have hereunto set my hand, at Moline, in the county of Rock Island and State of Illinois, in the presence of two witnesses.

CLAYTON L. BAKER.

Witnesses:
ELMER E. MORGAN,
A. WOEBER.